Figure 1:
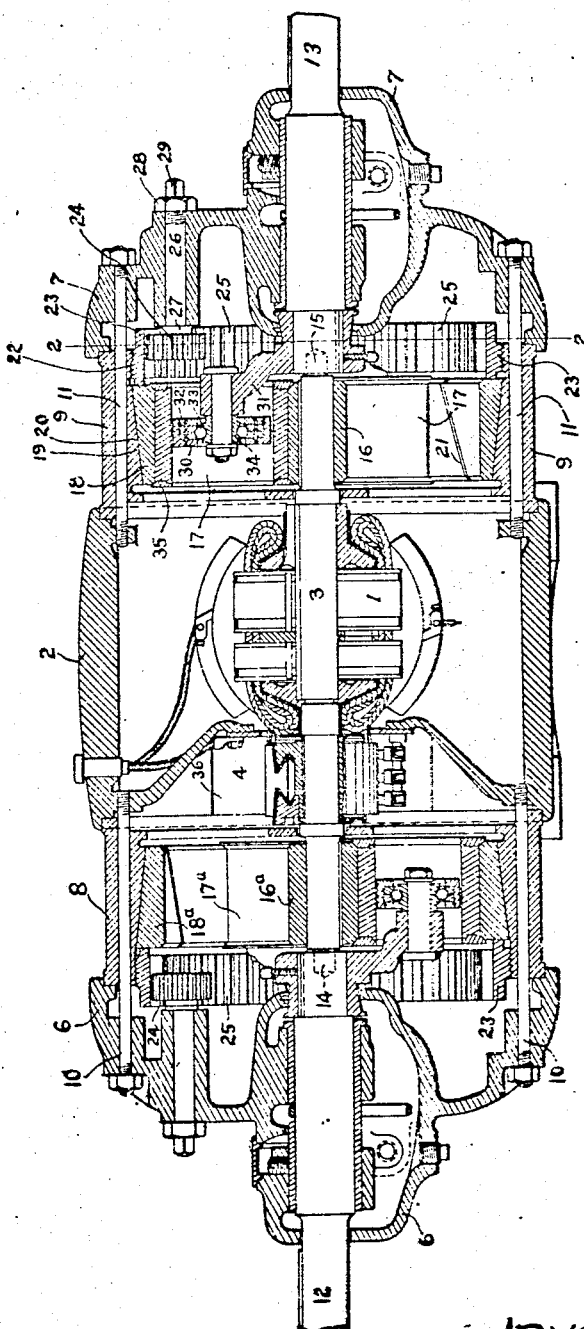

No. 877,015. PATENTED JAN. 21, 1908.
L. A. TIRRILL.
FRICTION GEAR.
APPLICATION FILED NOV. 23, 1904.

2 SHEETS—SHEET 1.

Witnesses:
Irving E. Steers

Inventor,
Leonard A. Tirrill.
By Albert G. Davis
Att'y

No. 877,015. PATENTED JAN. 21, 1908.
L. A. TIRRILL.
FRICTION GEAR.
APPLICATION FILED NOV. 28, 1904.

2 SHEETS—SHEET 2.

Witnesses:
Irving E. Steers.
Helen G. Ford.

Inventor,
Leonard A. Tirrill.
By Albert G. Davis
Att'y.

UNITED STATES PATENT OFFICE.

LEONARD A. TIRRILL, OF LYNN, MASSACHUSETTS, ASSIGNOR TO GENERAL ELECTRIC COMPANY, A CORPORATION OF NEW YORK.

FRICTION-GEAR.

No. 877,915.  Specification of Letters Patent.  Patented Jan. 21, 1908.

Application filed November 28, 1904. Serial No. 234,451.

*To all whom it may concern:*

Be it known that I, LEONARD A. TIRRILL, a citizen of the United States, residing at Lynn, in the county of Essex and State of Massachusetts, have invented certain new and useful Improvements in Friction-Gears, of which the following is a specification.

The present invention relates to friction drives or gearing of the type disclosed in Patent, No. 689,003, to Hult & Hult, granted December 17, 1901, in which a series of friction rings bear respectively upon the driving shaft and upon a fixed track or bearing and impart motion to the driven shaft through the medium of rolls carried by the driven shaft and projecting into the rings. Drives of this character, in order to be efficient, must be so arranged that the slippage between the driving shaft and the friction rings is entirely eliminated or at least reduced to an insignificant minimum. Provision is usually made for maintaining the proper tension upon the friction rings by adjusting the diameter of the track. Considerable difficulty has been experienced in providing simple and efficient means for enabling the track to be adjusted delicately and rapidly without interrupting the operation of the shafts or without dismantling the apparatus to a greater or lesser extent, and without producing excessive and injurious strains in the operating and supporting parts.

One of the objects of the present invention is to provide in a simple and compact construction means whereby a gearing of the character described may be readily and delicately adjusted without stopping the shafts or disturbing the structure as a whole.

A further object of the present invention consists in so arranging the driving apparatus that the strains incident to producing the proper tension upon the friction rings are so distributed that no tendency to distortion is caused thereby.

A further object of the present invention is to combine with an electric motor a gearing of the character described in such a manner that the whole produces a strong and compact construction.

To the above ends the track member of the gearing is constructed in the form of an open or split ring, wedge-shaped in cross-section and adapted to fit within a rigid outer supporting ring correspondingly inclined upon its interior. A screw-threaded part or other device, engaging with the outer ring, engages with one side of the track, whereby the track may be forced inwardly by the screw-threaded part in order to decrease the working diameter thereof. In this way the entire strain comes upon and is borne by the supporting ring or bearing which may be made sufficiently heavy to withstand the strains without being affected thereby.

The supporting ring is preferably made in one integral piece, whereby the strains are all contained within a unitary structure and do not tend to disarrange the friction gearing by reason of the loosening of bolts or other fastening devices. The outer ring may be rigidly supported in any suitable manner, and where the apparatus is associated directly with a motor, the ring may conveniently be situated between the field ring of the motor and the end bearing, forming a snug construction within which all the working parts are inclosed. The adjusting screw may then be conveniently operated by means of a shaft extending through the end bearing of the motor and provided with a hand-wheel at its outer end or with a neck adapted to receive a handle.

In the accompanying drawings I have illustrated the present invention in one of its forms and as applied directly to an electric motor.

Figure 2:
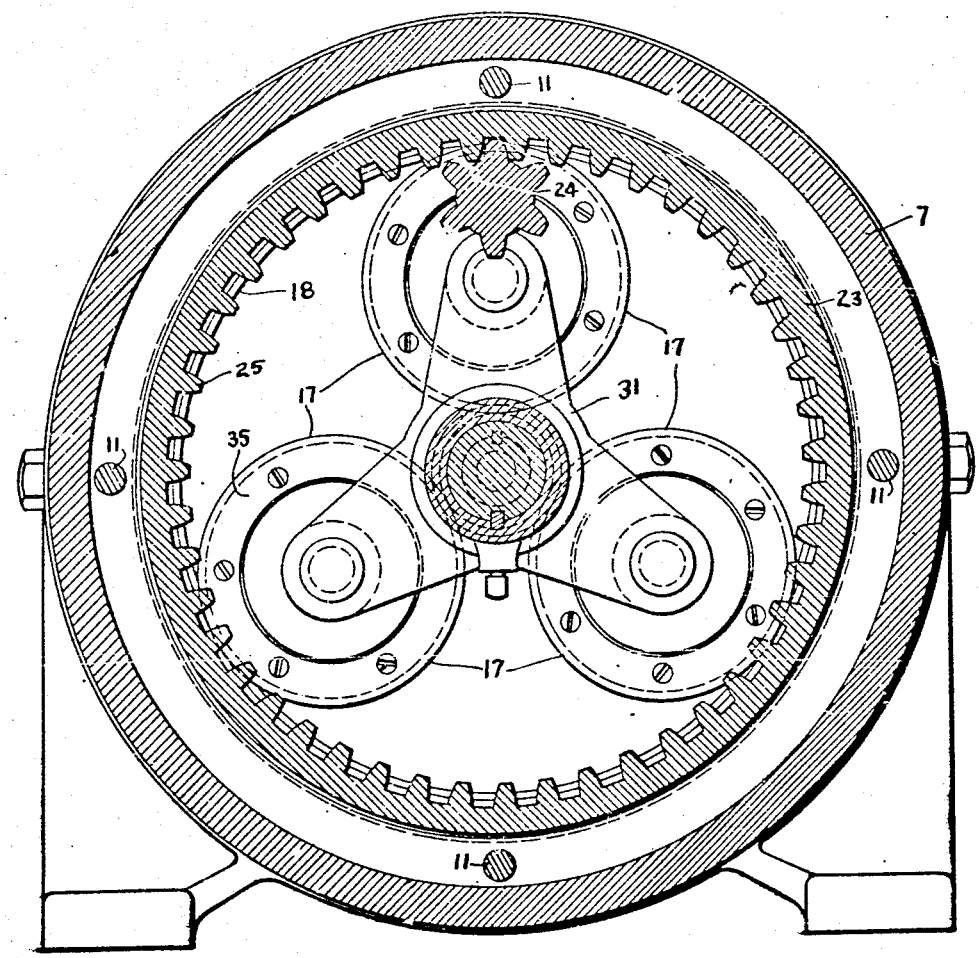

In said drawings, Figure 1 is a central longitudinal cross-section of a motor having applied at each of its ends a friction gearing constructed in accordance with the present invention; and Fig. 2 is a cross-section taken upon line 2 2 of Fig. 1.

Similar reference characters will be used throughout the specification and drawing to denote corresponding parts.

Reference being had to the drawing, 1 represents the armature of a motor; 2 the field ring thereof; 3 the armature shaft; 4 the commutator; and 5 the brushes which bear upon the commutator. These parts may be of any usual or desired construction since they in themselves form no part of the present invention.

6 and 7 are the end bearings, but instead of connecting these directly to the field ring they are separated therefrom in order to provide space upon each side of the field ring for a gearing device. It is of course evident that either of the end bearings may be placed immediately adjacent the field ring in the usual manner, and the armature shaft extended into the bearing, since the gearings need not be arranged in duplicate, except where it is desired to drive a countershaft at one end at one speed, and a second countershaft at the other end of the motor at a different speed.

Since the drives at opposite ends of the motor are similar in every respect, except as to the dimensions of their parts, only one of these friction gears will be described in detail.

8 and 9 are the inclosing rings supporting the tracks, and these are arranged respectively between the field ring and the bearing 6 and between the field ring and the bearing 7. The bearing 6, ring 8 and field ring 2 are secured together by means of bolts 10 which are subjected to no other stresses than those incident to the holding of these several parts firmly in position. The end bearing 7, the intermediate ring 9 and the field ring 2 are likewise joined by means of bolts 11. Instead of the bolts 10 and 11 other suitable fastening means may of course be employed. Within the bearings 6 and 7 are arranged the countershafts 12 and 13 which are axially alined with the motor-shaft 3, and, if desired, the shaft 3 may be provided with extensions 14 and 15 which engage within seats in the adjacent ends of the countershafts. At one end the armature shaft is provided with a sleeve 16, splined thereto or otherwise held thereon against rotation; the purpose of this sleeve being to take the wear which necessarily occurs at the driving end of the gearing. The sleeve 16 engages with a series of friction rings 17 which in turn bear upon the inner surface of the track ring 18. The track ring 18 and the supporting ring 9 are provided with complementary inclined surfaces 19 and 20, and the track ring has a section removed transversely thereof, as at 21, in order to permit the diameter of the ring to be changed slightly. The ring 9 is screw-threaded internally adjacent the outer end of the inclined portion 20, the screw-threads being adapted to mesh with complementary threads on an adjusting ring 23. When the ring 23 is screwed into place it abuts against the thick edge of the track ring and, by further turning the ring 23, the track ring is forced inwardly along the incline of the supporting ring 9 and its diameter decreased proportionately.

In operation the parts are adjusted so that the tension upon the friction driving rings 17 is such as to give the most efficient driving connection; and, as this tension is decreased, due to wear upon the parts, the adjusting ring 23 is screwed inwardly, forcing the track ring 18 in the same direction and further decreasing its diameter until the proper tension is again obtained. A convenient means for operating the adjusting ring consists in a pinion or worm 24 which meshes with complementary teeth 25 upon the interior of the adjusting ring. The member 24 is carried upon the end of the shaft 26 supported in and extending through the end bearing 7. The shaft 26 may be held against axial movement by means of shoulders 27 and 28, one of which engages with the interior and the other with the exterior of the end bearing plate, the shoulder 28 consisting of a nut screwed upon the shaft. The outer end of the shaft 26 is formed with an angular portion 29 adapted to receive a wrench or handle, or a hand-wheel of some sort may be permanently connected to the outer end of the shaft. In operation, rotation of the armature shaft 2 causes a rotation of the friction rings 17, which in turn transmit motion to the countershaft 13 through rollers 30 revolubly supported upon the arms of a spider 31 which is secured to the countershaft 13. The rollers 30 may have any suitable construction but comprise preferably a portion 32 mounted upon balls 33 which in turn are supported upon a bearing 34 attached to the spider 31. If desired, the friction rings 17 may be provided with flanges 35 screwed or otherwise secured thereto and adapted to engage with the side faces of the sleeve 16 and the track 18, whereby a perfect alinement of the parts is maintained. Power may be taken from either or both of the countershafts 12 and 13, and if one of the shafts, for example 12, is permitted to remain idle, then the corresponding driving mechanism serves as a most efficient bearing for the adjacent end of the armature shaft; namely, the sleeve 16$^a$ is no longer a driving sleeve and the friction rings 17$^a$ are no longer power-transmission members, but the friction rings 17$^a$ serve as rollers upon which the sleeve 16$^a$ is supported and partake of a rolling motion as the motor-shaft revolves.

It is apparent from the foregoing description that the tension upon the friction rings may be readily adjusted to any desired extent without disturbing the operation of the shafts and without producing any abnormal strains in the working parts, substantially the entire strain being borne by the heavy intermediate rings 8 and 9 and none at all coming upon the bolts or other securing means for the operating parts. Furthermore, by reason of the present method of adjustment the entire motor casing is rigid and uniform from end to end and has no parts which it is necessary to move or remove in order to adjust the gearing mechanism.

Where a friction drive is provided at each end of the motor-shaft a door 36 may be provided in the field ring adjacent the commutator in order to permit ready access to the brushes and commutator.

Although I have described the present invention in great detail as embodied in one form thereof, I do not desire to limit the present invention to the details illustrated and described except to the extent indicated in the claims, since various modifications may be made without departing from the present invention in its broader aspects.

What I claim as new and desire to secure by Letters Patent of the United States, is,

1. In combination, a motor field ring, an end bearing, an intermediate ring arranged between said field ring and said end bearing, and a friction drive mechanism including a track member supported within said intermediate ring.

2. In combination, a motor field ring, an end bearing, an intermediate ring arranged between said field ring and said end bearing, a friction drive mechanism including an open ended track ring, said intermediate ring and said track ring having complementary inclined engaging faces, and means for adjusting the track ring with relation to the intermediate ring.

3. In combination, a motor field ring, an end bearing, an intermediate ring arranged between said field ring and said end bearing, and a friction drive mechanism including an open-ended track ring supported within said intermediate ring, said track ring and said intermediate ring having complementary inclined engaging surfaces.

4. In combination, a motor field ring, an end bearing, an intermediate ring arranged between said field ring and said end bearing, a friction drive mechanism including an open-ended track ring supported within said intermediate ring, said intermediate ring being provided with a wedge face, and means for moving said track ring along said wedge face.

5. In combination, a contractile track ring, a supporting ring having a permanent diameter, and means including a ring screw-threaded into said supporting ring for varying the diameter of said track ring.

6. In combination, a motor field ring, an intermediate ring, an end bearing, a contractile track ring arranged within said intermediate ring, and means engaging said intermediate ring for changing the diameter of the track ring.

7. In combination, a motor field ring, an end bearing, an intermediate ring arranged between said field ring and said end bearing, a contractile track ring disposed within said intermediate ring, an adjustable member screwed into said intermediate ring, and means coöperating with said member for changing the diameter of the track ring.

8. In combination, a motor casing, friction drive mechanism inclosed within said casing, and means within said casing including an operating shaft projecting through the casing for adjusting the tension on the parts of said drive mechanism.

9. In combination, a motor casing, friction drive mechanism inclosed within and supported by said casing, means within the casing for adjusting the tension on the parts of said drive mechanism, and an operating member extending into proximity to the exterior of the casing.

10. In combination, a permanently arranged motor casing, friction drive mechanism inclosed within and supported by said casing, means wholly interposed between one member of said casing and said drive mechanism for adjusting the tension on the parts of said drive mechanism, and an operating shaft for said means.

11. In combination, a motor casing, friction drive mechanism including an elastic track ring wholly inclosed within said casing, means within the casing for adjusting the diameter of the track ring, and an operating shaft for said means.

12. In combination, a motor casing, friction drive mechanism including an elastic track ring wholly inclosed within said casing, means wholly interposed between said casing and said track ring for adjusting the diameter of said track ring, and an operating shaft for said means.

13. In combination, a motor casing, friction drive mechanism including an elastic track ring supported by and within a portion of said casing, means interposed between said track ring and said portion of casing for adjusting the diameter of the track ring, and an operating member extending into proximity to the exterior of the casing.

14. In combination, a motor casing, friction drive mechanism including an elastic track ring supported by and within a portion of said casing, means for adjusting the diameter of said track ring including a member screw-threaded into said portion of casing, and means operable from the exterior of the casing for operating said member.

15. In combination, a motor casing, friction drive mechanism including an elastic track ring supported by and within a portion of said casing, means for adjusting the diameter of said track ring including a member screw-threaded into said portion of casing, a shaft extending to the exterior of the casing, and gearing between said member and said shaft.

16. In combination, a rotary armature of a motor and friction drive mechanisms located at opposite ends of the armature and forming bearings for the armature shaft.

17. In combination, a rotary armature of a motor, a motor field ring, end bearings, intermediate rings connecting said field ring to said end bearings, and friction drive mechanisms arranged within said intermediate rings and forming bearings for the armature shaft.

In witness whereof, I have hereunto set my hand this twenty-fifth day of November 1904.

LEONARD A. TIRRILL.

Witnesses:
JOHN A. McMANUS, Jr.,
DUGALD McK. McKILLOP